April 10, 1928.
M. W. ESCH
1,665,585
METHOD AND APPARATUS FOR MAKING LAMINATED ANNULAR ARTICLES
Original Filed Feb. 29, 1924
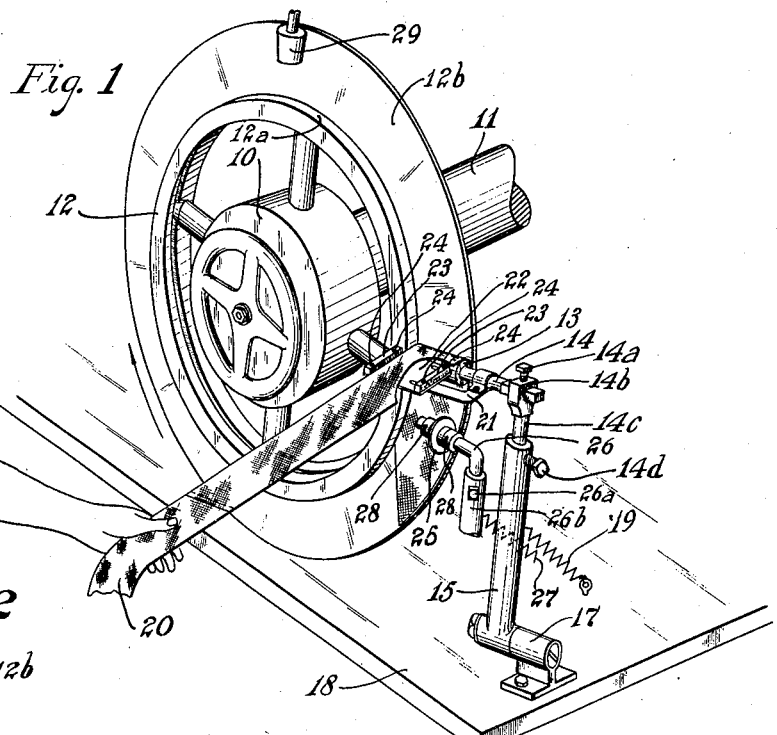
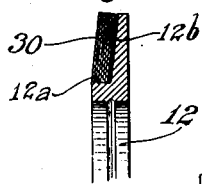
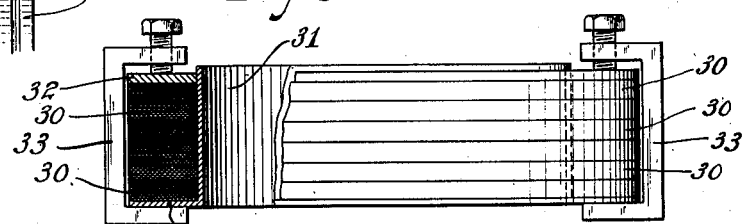
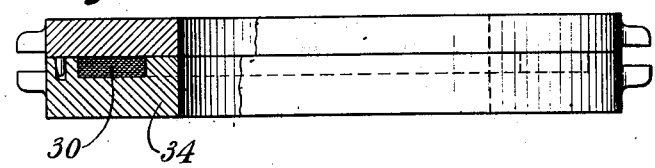
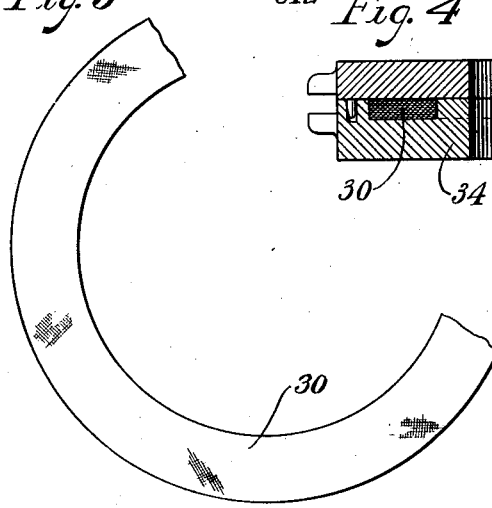
Inventor
Max W. Esch
By Robert M. Pierson
Atty.

Patented Apr. 10, 1928.

1,665,585

UNITED STATES PATENT OFFICE.

MAX W. ESCH, OF AKRON, OHIO, ASSIGNOR TO THE B. F. GOODRICH COMPANY, OF NEW YORK, N. Y., A CORPORATION OF NEW YORK.

METHOD AND APPARATUS FOR MAKING LAMINATED ANNULAR ARTICLES.

Application filed February 29, 1924, Serial No. 695,990. Renewed February 23, 1928.

This invention relates to methods and apparatus for making annular articles and more particularly laminated, disc-like articles composed of a plurality of joined layers of sheet material such as rubberized fabric, suitable for use as annular cushioning members interposed between the felloes and hubs of vehicle wheels, as universal joint coupling discs, as gaskets, and in other connections.

The general object of my invention is to provide an improved method and improved apparatus for producing such articles. A more specific object is to provide improved means for accurately bending a strip of sheet material substantially in its own plane with a minimum of tension in the strip, as in winding it in helical convolutions onto a non-cylindrical, annular surface. Other objects are the saving of time and labor in the manufacture of laminated annular articles of the character described.

Of the accompanying drawing:

Fig. 1 is a perspective view of apparatus embodying and adapted to carry out my invention, and the work associated therewith.

Fig. 2 is a transverse section of a part of a form upon which the article is built, and the article thereon.

Fig. 3 is a side elevation, partly in section, of a plurality of articles prepared for semi-curing, and means for holding them compressed during the partial cure.

Fig. 4 is a similar view of a mold adapted for the final vulcanizing of the article, and the article therein.

Fig. 5 is a fragmentary plan view of the finished article.

Referring to the drawings, 10 is an expansible chuck mounted on the end of a horizontal, rotatable shaft 11, and 12 is an annular building form supported by said chuck. The form 12 is provided with an approximately cylindrical face $12^a$, from one annular margin of which extends outwardly a slightly coned or beveled annular face $12^b$, the face $12^a$ being tapered slightly toward the adjoining face $12^b$ so as to join the latter at right angles, the face $12^b$ being straight in cross-section and adapted to receive a strip of sheet material curved in its own plane, and the face $12^a$ being adapted to position the inner edge of said strip. Co-operatively associated with the face $12^b$ is a roller 13, preferably cylindrical, which is loosely journaled on the free end of a rod 14, the other end of which is squared and adjustably secured by a set screw $14^a$ in a head $14^b$ having a stem $14^c$, the latter being adjustably secured by means of a set screw $14^d$ in an axially bored, upstanding arm 15. Said arm 15 is so pivoted to a bracket 17, on a suitable support 18, as to be tiltable from and toward the form 12 to present the roller 13 to and retract it from the face $12^b$ of said form. A pull-spring 19 is connected at one end to the arm 15 and at its other end to the support 18, being thus adapted yieldingly to urge the roller 13 toward the face $12^b$ of the form, said roller being thus adapted to guide a bias-cut strip 20 of rubberized fabric onto the face $12^b$ of said form and press it against the latter, in a manner causing the fabric to be bent in its own plane to follow the face $12^b$ of the form.

Adjustably clamped on the rod 14 is a bracket 21, on which is mounted a guide for the strip 20, said guide comprising a plate 22, over which the strip slides, and a pair of side guides 23, 23, adjustably secured on said plate by clamping bolts 24, 24, passing through slots in the latter. Said slots are slightly wider than the diameter of the bolts, so that said side guides may be adjusted angularly to vary the direction of approach of the strip 20, and the guide, with the bracket 21, may be adjusted from and toward the axis of the form upon the rod 14.

The arrangement just described is such that the roller 13 may be secured at different elevations, and the head $14^b$ may be secured in different angular positions, both by means of the set screw $14^d$, to vary the angular position of said roller with relation to the form 12 as may be necessary to obtain an accurate guiding and effective pressing of the strip 20 onto the form, the rod 14 being adjusted in the head $14^b$ to position said roller close to the face $12^a$ of the form when the roller-supporting structure is raised or lowered, or when forms of different size are used. The proper angular position of the roller 13 may readily be ascertained by trial and in practice I find it is such that the axis of said roller is approximately normal to the face $12^a$, radial with relation to the axis of the form, and parallel with the face $12^b$ of the form, but it will be observed that the roller 13, by being raised or lowered, may be so adjusted that its axis extended will pass above or below the axis of rotation of the form, and that by angular adjustment of the head 14^b said roller may be so positioned as to press harder against the work at one end than the other.

For additionally pressing the outer margin of successive convolutions of the fabric strip as the latter passes onto the form 12, a narrow presser roller 25 is journalled upon the end of a bent rod 26, the other end of which is adjustably secured by a set screw 26^a in the top of an axially bored arm 26^b whose base portion and mounting are omitted from the drawing, being similar to those of the arm 15. 27 is a pull spring adapted to urge the roller 25 against the work. Said roller is journalled between adjustable collars 28, 28, on the rod 26, so that it may be secured in different positions radially of the work, to run upon the outer margin of articles of different size. One or more other presser rollers, such as 29, may be provided at other parts of the form, the function of the rollers 25 and 29 being to compact the successive convolutions of fabric and prevent them from buckling under the relatively high tension of their outer margins.

The preferred form of my method of assembling the annular article is shown in Fig. 1, where the strip 20 is formed of lengths of rubberized, bias-cut fabric joined end to end by lapped splices to form a continuous strip, preferably of a length sufficient for at least one article. While I have here shown woven fabric, other types of material, such as the weak wefted or weftless fabric used in pneumatic tires may be employed, and I desire to include in the term "rubberized fabric", where used in the appended claims without contrary limitation, all materials comprising rubber associated with strength giving threads. For articles of woven fabric in which the wound strip is wide and the article small, a loosely woven fabric may be used in order that it may be the more readily bent in its own plane.

In practicing my method, the leading end of the strip is adhesively attached to the face 12^b of the form 12, under the roller 13, with one margin of the strip abutting the face 12^a, said face 12^b being cemented to hold the strip thereon. The form 12 is then rotated, in the direction of the arrow, drawing the strip 20 over the guide plate 22 and the presser roller 13 and onto said form in successive convolutions, the roller pressing the work in place against the face 12^b of the form. The strip is manually held, as shown, preferably with but little tension, so that it slides over the plate 22 and is guided by the side guides 23.

It will be seen that the relatively great peripheral speed of the face 12^b at its outer margin, in passing the stationed guiding and pressing roller 13, as compared with the peripheral speed of the inner margin of said face, results in the strip being substantially stretched at said outer margin while being stretched but little or even compressed longitudinally, at the inner margin of the face 12^b. The strip is thus bent substantially in its own plane, there being in effect a fanwise wiping of the strip onto the form by the cylindrical roller 13, which necessarily has the same peripheral speed throughout its length. The action may be visualized by considering that the peripheral speed of roller 13 is less than the speed of the form at the other end of said roller, so that at that position the roller holds back and stretches the fabric, while at the inner end of the roller 13 its speed is greater than that of the adjacent part of form, so that said roller at that position wipes the fabric forward in pressing it against the form thus tending to reduce its stretch or place it under longitudinal compression. In actual practice, with apparatus and work of substantially the same relative dimensions as are shown in the accompanying drawings, in which the inner diameter of the form was 18¼ inches, a longitudinal shortening of the inner margin of the bias fabric strip amounting to 3⅛ inches or approximately 5% of the original length of the strip, has been obtained, and this without substantial wrinkling of the fabric.

Another way of visualizing the action of the roller 13 is to consider the fact that the portion of the strip already applied to the form at any given time after the start of the operation has such relatively large area of contact, or such adhesive contact, therewith, as to be prevented from slipping thereon, wherefore the fabric is forced to slip upon the roller 13 with a relative angular movement, the fabric being pulled about the outer end of said roller with a speed faster than that of the roller, while at the inner end of the roller the fabric, by its adhesive contact with the form, is held to a slower speed than that of the roller.

However the action be considered, it will be seen that the change of tension in the outer and inner margins respectively of the fabric strip is so localized at its position of application to the form that widely different conditions of tension may be had in the respective margins, and yet the fabric may be accurately laid with but little general tension, or with the inner margin longitudinally compressed, and without buckling of the fabric. The stretching of the outer margin of the strip, being thus localized, is not transmitted to the approaching reach of the strip in such degree as to stretch the inner margin of the approaching strip by oblique, resultant forces, and thus require a subsequent re-shortening of said inner margin.

While the result of bending or coiling the strip into position is largely inherent in the construction and relation of the form 12 and the roller 13, it may be aided and regulated by the guiding of the strip onto the roller 13, the relative tightness of the fabric upon the inner and outer ends of the roller respectively, anterior to the nip, varying with the direction of approach of the strip. As the guiding factor may be thus employed to compensate variations from the ideal in other factors, such as the angular position and form of the roller, I do not wholly limit my claims to a guiding and pressing roller of true cylindrical form, although I prefer such form because it permits such guiding angle as to cause the strip to approach and pass onto the roller with its respective margins under substantially equal tension. Excessive stretching of the inner margin of the strip as it approaches the roller may thus be avoided, and a greater stability of conditions may be obtained than with a non-cylindrical roller.

The beveled or coned feature of the face 12$^b$ of the form permits the fabric strip to be laid smoothly and without buckling such as would be more likely to result if the convolutions were coiled upon a plane annular face, since on the coned form the tension in the outer margin of the laid fabric causes the latter to lie snugly against and in a sense to grip the coned surface. In other words, the tendency of the outer peripheral margin of the article to contract upon the form, by an over-center effect holds said outer margin against the face 12$^b$ instead of away from it, as might occur if said face were plane instead of coned, as readily may be visualized by reference to Fig. 2. The strip of material is thus held substantially straight in cross section while bent substantially in its own plane.

The rotation of the form is continued until the desired number of superposed plies have been built up, or until the form is full, as shown in Fig. 2, wherein 30 represents the assembled article. The article preferably is then removed from the building form and supported by other means while being vulcanized.

Because of the tension of the fabric at the outer periphery of the article, the latter, when removed from the form, tends to approach a cylindrical shape, requiring that, after being wound, the article be fixed in the shape desired, as by vulcanization in the case of an article formed, as described, of rubberized fabric.

For this purpose I provide, in case a flat article is desired, a cylindrical support or mold member 31, Fig. 3, upon which one or more of the annular articles are mounted, said support having a base flange 31$^a$ upon which said article or a stack of such articles, rests, and a heavy removable collar 32, which is placed upon the article, or stack of articles, to hold the same flat. A stack of the articles, 30, 30, with the collar 32, being assembled upon the support 31 as shown in Fig. 3, the articles being prevented from adhering to each other, as by dusting them with soapstone, are pressed together and held by suitable screw-clamps 33, 33. In this condition they preferably are vulcanized only sufficiently to "set" the rubber in the fabric, and so fix the article in the desired form, after which they are removed from the support. Their vulcanization is then completed, preferably in individual molds such as 34 (Fig. 4).

The finished article, which obviously may be made of such size and character as to be suitable for various uses, is shown in Fig. 5. The article itself, however, is not claimed as a part of my invention, as I am aware that such articles heretofore have been made by stretching a fabric strip longitudinally onto the outer periphery of a form, thereby giving the fabric strip a U-shape in cross-section, the margins of the strip being pressed against the side faces of the form in the manner of building a pneumatic tire, and the resulting structure then being cut longitudinally along the crown to provide two generally disc shaped structures. In such procedure, however, if a single cut is made along the crown of the work, each of the severed halves of the latter, as taken from the form, has such curvature in cross-section, particularly at its outer margin, as to present a problem in the flattening and vulcanizing thereof, and if the sharply curved crown portion is removed, as by cutting the work longitudinally along each side of the crown, excessive waste is involved.

It will be observed that my invention differs from the procedure just described in that I initially build up the work in such form that the coiled structure, instead of being U-shaped in cross-section, has its largest diameter at one edge of the coiled strip, and in the particular form herein shown the coiled structure is straight in cross-sectional form, so that the cross-sectional form does not require to be modified, although the structure as a whole is changed from cone-shaped to flat, in the vulcanizing operation. I do not wholly limit my invention to a form which is perfectly straight in cross-section, however, as the advantages over the prior procedure above described may be had in substantial measure so long as the structure is built up against the side face only of the form, as distinguished from a structure built over the crown of the form, with its greatest diameter having its termini, not at the edge of the strip, as in my method, but at the part thereof lying over the crown of the form.

Modifications may be resorted to within the scope of my invention, and I do not wholly limit my claims to the specific construction of the apparatus shown nor to the exact procedure described.

I claim:

1. The method of making a laminated, annular article which comprises winding a strip of sheet material into an annular, laminated structure of a form other than flat, of which the greatest diameter, during the winding, has its termini at one edge of the strip, flattening said structure to a disc-like, annular form with laminations lying substantially in parallel planes, and fixing said structure in such flattened form.

2. The method of making a laminated, annular article which comprises winding a strip of bias-cut, rubberized fabric into an annular, laminated structure of a form other than flat, of which the greatest diameter, during the winding, has its termini at one edge of the strip, flattening said structure to a disc-like, annular form with the laminations lying substantially in parallel planes, and vulcanizing said structure in such flattened form.

3. The method of making a laminated, annular article which comprises coiling a strip of sheet material by bending it while holding it substantially straight in cross section, to form a conical helical structure, flattening said conical structure, and fixing said structure in such flattened condition.

4. The method of making a laminated, annular article which comprises coiling a strip of vulcanizable sheet material by bending it while holding it substantially straight in cross section, to form a conical, helical structure, flattening said conical structure, and joining the convolutions of said structure by vulcanization.

5. The method of making a laminated, annular article which comprises coiling a strip of bias-cut, rubberized fabric by bending it while holding it substantially straight in cross section, to form a conical, helical structure, flattening said conical structure, and joining the convolutions of said structure by vulcanization while the same is flattened.

6. The method of making a laminated, annular article which comprises helically winding a strip of bias-cut, woven, rubberized fabric into a conical structure, flattening said conical structure, and vulcanizing it while holding it flat.

7. The method of making a laminated, annular article which comprises helically coiling a strip of loosely woven, bias-cut, rubberized fabric into an annular, laminated structure of which the greatest diameter, during the winding, has its termini at one edge of the strip, the strip being so bent in the coiling thereof that its successive turns lie nested one within the other, and vulcanizing said structure.

8. The method of making a laminated, annular article which comprises winding a rubberized, bias-cut, fabric strip into an annular, laminated structure of a form other than flat, subjecting said structure to a pressure whereby it is flattened to a disc-like form with the lamination lying substantially in parallel planes, partially vulcanizing said structure while holding it flat, to set it in such form, relieving said pressure, and then completing the vulcanization in a further operation.

9. The method of making laminated, annular articles which comprises forming, of bias-cut, rubberized fabric, a plurality of annular, laminated structures normally assuming a form other than the flat, final form of the article, stacking a plurality of said structures, and partially vulcanizing the same while holding them in flattened disc-like form by pressure applied to the stack, and thereafter completing the vulcanization of said structures in a further operation.

10. Apparatus for making laminated, annular articles, said apparatus comprising a form having a non-cylindrical, annular face, approximately straight in cross-section, and a roller adapted to run longitudinally on said face, following the latter, to press the work thereagainst, means for yieldingly urging said roller towards said face, and means for so guiding a strip of sheet material onto said roller as to cause the strip to pass partly around said roller to the nip of said roller and said form.

11. Apparatus for making laminated, annular articles, said apparatus comprising a form having a non-cylindrical, annular, work-receiving surface, a roller adapted to run on said surface to press the work thereagainst as a strip of sheet material, constituting the work, is fed over said roller onto said face, said roller being of such form as to contact the work substantially throughout the width of said work-receiving surface and to be driven by the work with greater peripheral speed than that of the form at the inner end of the roller and with less peripheral speed than that of the form at the outer end of the roller, and an additional presser roller adapted to press the outer margin of the work on said face as said work is built up in helical convolutions.

12. Apparatus for making laminated, annular articles, said apparatus comprising a form having a conical, annular face, and means for guiding and pressing a strip of sheet material flatwise onto said face.

13. Apparatus for making laminated, annular articles, said apparatus comprising a form having a non-cylindical, annular face approximately straight in cross-section, and a substantially cylindrical roller adapted to run on said face to press the work thereagainst, a support for said roller adapted to be so adjusted as to vary the angular position of said roller about an axis extending longitudinally of said face at the side thereof, and yielding means connected to said support to press the roller against said face.

14. Apparatus for making laminated, annular articles, said apparatus comprising a form having a non-cylindrical, annular face approximately straight in cross-section, and an approximately cylindrical roller adapted to run longitudinally on said face following the course of the latter to press the work thereagainst, a support for said roller adapted to be so adjusted as to vary the angular position of said roller about an axis extending longitudinally of said face at the side thereof, and about an axis substantially normal to said face, and yielding means connected to said support for urging said roller toward said face.

In witness whereof I have hereunto set my hand this 25th day of February, 1924.

MAX W. ESCH.